United States Patent [19]

Kasai

[11] 3,905,835

[45] Sept. 16, 1975

[54] ALKALI BUTTON BATTERY

[75] Inventor: Yoshihiko Kasai, Shimosuwa-machi, Japan

[73] Assignee: Kabushiki Kaisha Suwa Seikosha, Tokyo, Japan

[22] Filed: June 6, 1974

[21] Appl. No.: 477,065

[30] Foreign Application Priority Data

June 7, 1973  Japan.............................. 48-64080

[52] U.S. Cl. ............................................. 136/111
[51] Int. Cl. ......................................... H01m 21/00
[58] Field of Search .......... 136/111, 107, 134, 135, 136/163, 169

[56] References Cited

UNITED STATES PATENTS

| 2,829,189 | 4/1958 | Coleman et al.................... | 136/107 |
| 2,862,987 | 12/1958 | Morgan............................... | 136/111 |
| 3,673,000 | 6/1972 | Ruetschi............................. | 136/107 |

Primary Examiner—Anthony Skapars
Attorney, Agent, or Firm—Waters, Schwartz & Nissen

[57] ABSTRACT

An alkali button battery comprising a highly alkaline electrolyte and wherein a gold or gold alloy coating is formed on at least part of the terminal surface of its positive and/or negative electrodes without being connected with the interior of the battery.

6 Claims, 4 Drawing Figures ly its internal resistance and consequently lowers its voltage to a degree that its current output is decreased so much that the battery becomes useless.

ALKALI BUTTON BATTERY

BACKGROUND a. Field of the Invention

This invention relates to an alkali button battery including a highly alkaline electrolyte.

b. Prior Art

Conventionally, most alkali batteries use nickel-plated steel or stainless steel for their battery case material. Nickel alloys such as monel metal are regarded as preferable.

However, since their electrical contact resistance is high, a relatively great contact pressure is required by the terminal spring of an instrument in which the battery is used. Thereby, the battery is strongly compressed and causes long term leakage at the interface of its gasket. This tendency is substantial especially in small-sized button batteries.

Furthermore, it has been established experimentally that the internal resistance of the battery is increased if a gold or gold alloy coating is electrically connected with the alkaline electrolyte inside the battery. A silver oxide-zinc alkali battery of a diameter of 11.6 mm and a height of 5.4 mm which is plated with a layer of gold of a thickness of about 1 $\mu$ inside its cap has, in comparison with an uncoated cap of stainless steel with copper cladding, an internal resistance of 15 $\Omega$ compared to 6 $\Omega$ as measured according to 1,000 Hz alternating current method at a room temperature of +24°C. The lower the temperature, the more substantial the difference.

SUMMARY OF THE INVENTION

An object of the invention is to produce an alkaline button battery having reduced internal resistance, reduced contact resistance of the terminal surface of the battery and minimized leakage.

This invention contemplates an alkali button battery provided with a plating of gold or gold alloy only on the exterior surface of its positive and/or negative electrode whereby the contact resistance is reduced, and the internal resistance is not raised and leakage is minimized.

It is not certain why the internal resistance is increased by the presence of gold or gold alloy inside the battery, but it seems that gold ions reduce the reaction area. A battery which includes gold ions near its zinc negative electrode and at its separator shows an extraordinarily high internal resistance. When temperature is lowered, its voltage drops greatly and its current supply becomes very low.

This is demonstrated in Table 1 hereafter.

1 The drop in voltage is for the case when momentary load is 7.5 K$\Omega$.

2 The values of leakage are obtained according to the ten time −10°C/24H, +60°C/24H thermal cycle test.

As seen from Table 1, the desired battery characteristic can be obtained only by providing a gold or gold alloy plating on the outer surface of the battery case. The plating can be effected by means of plating, deposition, cladding, adherence or the like.

DETAILED DESCRIPTION

Figure 1:
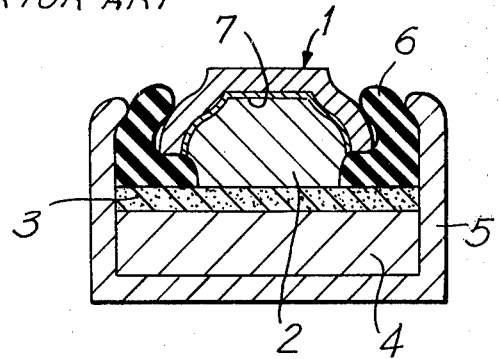
FIG. 1 is a sectional view of a conventional battery in which the inside surface of an anode cap of stainless-steel is provided with a copper cladding.

Referring to FIG. 1 wherein a conventional alkaline button battery is illustrated, therein are seen its component parts comprising anode cap 1, anode 2, separator 3 containing a highly alkaline electrolyte such as potassium or sodium hydroxide, cathode 4, cell can or casing 5 and gasket 6 interposed between the casing 5 and the anode 2 and anode cap 1. The cathode is constituted of silver oxide hence giving rise to the term "silver battery." The casing and anode cap are of stainless-steel and the anode cap 1 is provided on its inside surface with a copper cladding 7. The battery has the characteristics shown in the last line of Table 1.

Figure 2:
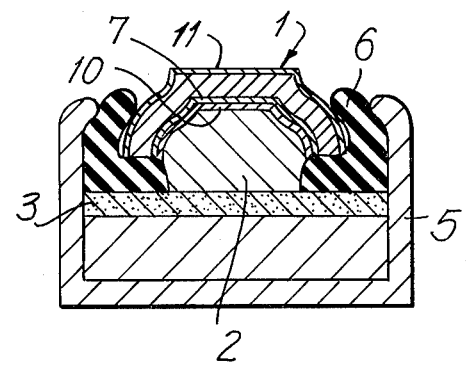
FIG. 2 is a sectional view of a battery in which the inside surface of a copper clad stainless-steel anode cap is provided with a gold plating on both the inside and outside surfaces thereof.
Figure 3:
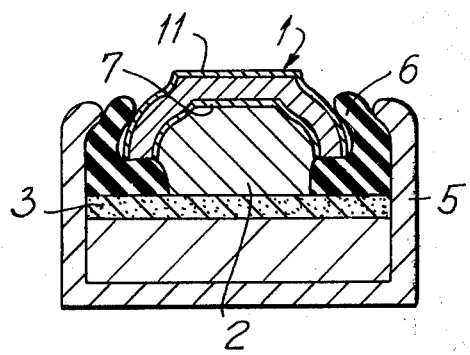
FIG. 3 is a sectional view of a battery according to the invention in which only the outer surface of the anode cap is plated with a gold layer.

FIG. 2 shows the battery of FIG. 1 wherein a plating of gold is provided on both the interior and exterior surfaces of the cap 2 and respectively denoted at 10 and 11. This battery has the characteristics as shown in the middle line in Table 1. FIG. 3 is an embodiment of the invention and shows the battery of FIG. 1 wherein only the exterior of the cap is coated with the gold layer as shown at 11.

In the embodiment of FIG. 3 the gold layer 11 is constituted as an 18 K gold plating of a thickness of at least 0.1 $\mu$ on the exterior surface of the stainless-steel cap 1. The cap is made by draw forming the resulting plated material. The contact resistance, leakage and internal resistance of the battery of FIG. 3 using the particular coated battery cap are shown in Table 1. When assembled in a timepiece which is tested for prolonged periods, the terminal surface undergoes no damage. On the contrary, a battery using a stainless-steel cap without Table 1

| kind of battery | contact resistance $\Omega$ | | internal resistance (alternating $\Omega$ current method) | | | drop in voltage at −10°C | leakage (%) |
| --- | --- | --- | --- | --- | --- | --- | --- |
| | load 100g | load 300g | (+)24°C | 0°C | −10°C | | |
| gold-plated (only the outer surface) | 0.82 | 0.32 | 6 | 32 | 85 | 35 | 0.3 |
| gold-plated (also the internal surface) | 0.80 | 0.30 | 15 | 300 | 600 | 40 | 0.3 |
| stainless steel | 9.00 | 2.0 | 6 | 33 | 88 | 130 | 2.0 | the gold plating is discolored at its contact portion, and the contact resistance of the portion is substantially increased.

Figure 4:
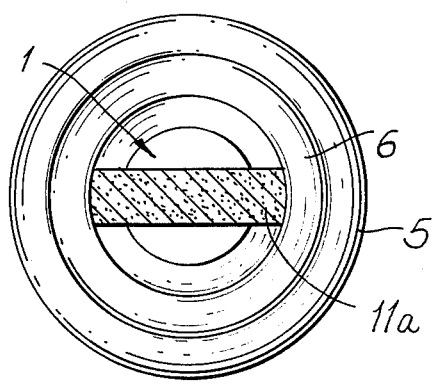
FIG. 4 is a plan view of a modification in which the gold layer is formed in a narrow strip over only the contact portion of the anode cap.

FIG. 4 shows an arrangement wherein the gold plating layer 11a is formed in a narrow strip covering only the contact region of the battery by any suitable pattern deposition method.

The battery is suitable for use in a hearing aid. In this embodiment, it is possible to satisfy the desired quality with the use of a relatively small amount of gold. The temperature characteristic of the hearing aid is good and a shock-resistant power source for the hearing aid can be guaranteed for this embodiment, as well as that of FIG. 3.

A still greater improvement can be obtained if the exterior surfaces of both the cap 1 and the casing 5 are coated with the gold layers.

As known, alkali button batteries for small-sized electrical instruments can be used in may ways, for example, in electronic wristwatches, hearing aids, photometers of cameras etc. The battery according to the invention has great industrial value by reason of the reduced contact resistance and reduced internal resistance while long-term stability is obtained.

What is claimed is:

1. An alkali button battery comprising an alkaline electrolyte, an anode, a cathode, an anode cap in electrical contact with said anode, a casing in electrical contact with siad cathode, and a layer of gold or gold alloy on at least one of said cap and casing only on the exterior surface thereof.

2. A battery as claimed in claim 1 wherein said layer is in the form of a narrow strip.

3. A battery as claimed in claim 1 wherein said layer has a thickness of a least 0.1 $\mu$.

4. A method of reducing the electrical contact resistance of an alkali button battery without increasing electrical resistance, said method comprising applying a layer of gold or gold alloy on only the exterior surface of at least one of the outer contact surfaces of the battery.

5. A method as claimed in claim 4 wherein said layer is applied in the form of a narrow strip on said exterior surface in the region thereof which is to be electrically contacted.

6. A method as claimed in claim 4 wherein said layer is deposited with a thickness of at least 0.1 $\mu$.

* * * * *